United States Patent Office 3,283,007
Patented Nov. 1, 1966

3,283,007
PRODUCTION OF AMINE OXIDES
Albert F. Chadwick, Wilmington, Del., assignor to E. I. du Pont de Nemours and Company, Wilmington, Del., a corporation of Delaware
No Drawing. Filed June 28, 1963, Ser. No. 291,273
6 Claims. (Cl. 260—583)

This invention relates to the preparation of amine oxides and particularly to the preparation of amine oxides of teritary aliphatic amines by the reaction of such amines with hydrogen peroxide.

The amine oxides of tertiary amines of the formula

in which ecah of $R^1$ and $R^2$ are methyl or ethyl and $R^3$ is an alkyl having from 10 to 20 carbon atoms are useful for many purposes and particularly as detergents and surface active agents.

Amine oxides of the above type can be prepared by reacting the amine with dilute aqueous hydrogen peroxide. However, when using dilute peroxide solutions the rate of reaction is quite slow, complete conversion of the amine to the amine oxide is difficult to achieve and the product amine oxides are obtained as dilute solutions. When more concentrated aqueous peroxide solutions, e.g., the 20 to 90% solutions available commercially, are employed in an attempt to offset the disadvantages attending the use of more dilute solutions, the reaction mixture sets up as a gel resembling a thick starch paste long before completion of the reaction, making effective agitation and uniform control of the reaction temperature impossible.

The co-pending application of Chadwick, Serial Number 250,018, filed January 8, 1963, now U.S. Patent No. 3,215,741, describes a method whereby much more concentrated hydrogen peroxide solutions can be successfully employed to effect substantially complete conversion of the amines of the above type to amine oxides at practical rates, to yield directly relatively concentrated, e.g., 30 to 40%, solutions of the amine oxides. That method involves gradually adding the concentrated peroxide solution to the amine under agitation at 40 to 80° C., continuing the agitation and maintaining the temperature of the mixture in the above range until the amine is substantially completely converted to the oxide and, during the course of the reaction, diluting the reaction mixture with only such an amount of water as is required to permit effective agitation of the reaction mixture.

When the amine oxide product is to be employed as a detergent, essentially complete conversion of the amine to the amine oxide is highly desirable since the presence of more than about 5% of the amine in unconverted form greatly reduces the detergent properties of the amine oxide. The method of the above Chadwick application can be practiced to yield directly concentrated amine oxide solutions with conversions of 98% or more of the amine to the oxide when employing no more than about a 10% excess of the peroxide reactant. However, such high conversions were obtained only when employing amines which had been freshly distilled. Apparently distillation of the amines in the form in which they are available commercially removes impurities whose presence in the reaction mixture reduces the peroxide efficiency in the amine oxide reaction.

It is an object of the invention to provide an improved method of converting aliphatic tertiary amines to amine oxides by reaction with hydrogen peroxide. A particular object is to provide an improved method for effecting the oxidation of commercial grades of amines of the above general formula with hydrogen peroxide whereby substantilaly complete conversions of the amine to the amine oxide can be realized without the necessity of distilling the amine reactant prior to its use. Still further objects will be apparent from the following description.

The objects of the invention are accomplished by adding to the commercial grade amine reactant a small amount of diethylenetriaminepentaacetic acid (DTPA) or one of its water soluble salts such as its ammonium and alkali metal salts, and then oxidizing the amine to its oxide with hydrogen peroxide in the presence of the added DTPA. Preferably, the oxidation with hydrogen peroxide is effected by the method described in the above Chadwick application, i.e., by gradually adding at least a stoichometric amount of the hydrogen peroxide reactant as an aqueous solution containing at least 20% $H_2O_2$ by weight to the amine under agitation at 40 to 80° C., continuing the agitation and maintaining the mixture at a temperature in the above range until the amine is substantially cmopletely converted to the oxide and, during the course of the reaction, adding diluent water to the reaction mixture only in such an amount as is required to permit effective agitation of the reaction mixture.

Most preferably, the hydrogen peroxide is employed as a 30 to 75% aqueous solution in an amount corresponding to about a 10% excess and is added to a body of the amine maintained at 55 to 65° C., following which the reaction is completed at a temperature from 65 to 80° C.

It has now been discovered that conversions of the amine to the amine oxide approaching 100% can be readily realized by simply pre-mixing with the commercial grade amine, prior to its oxidation, a small amount of diethylenetriaminepentaacetic acid (DTPA) or an ammonium or alkali metal salt thereof. In order to insure a conversion of at least 98%, the amount of DTPA or its water soluble salt to be added should equal at least 0.005% of the weight of the amine. Amounts greater than about 3% are effective but generally will not be used for cost reasons and because no added advantages are gained thereby. The preferred amounts range from about 0.01 to 1.5%.

DTPA and its water soluble salts such as its various ammonium and alkali metal salts, particularly its mono-, di-, tri-, tetra- and penta-sodium and potassium salts, are well-known metal chelating agents. Although the mechanism by which their use in accordance with the invention improves the conversion of the amines to their oxides is not understood, it appears that they function to deactivate heavy metal contaminants, including iron, chromium, nickel and copper contaminants, present in the unpurified commercial grade amine, which contaminants normally have an adverse effect upon the oxidation reaction. It has been found, that other well-known commercially available metal chelating agents such as ethylenediaminetetraacetic acid, gluconic acid and their alkali metal salts are much less effective when used in the same way. DTPA and its above salts appear to be unique among the many known chelating agents in their effectiveness for the present purpose.

The invention is illustrated by the following examples. All composition percentages reported are by weight.

*Example 1*

A sample of a commercial (undistilled) dimethyldodecylamine (DDA) having a neutralization equivalent of 231.5 was employed in the absence of any chelating agent. A 115.7 g. (0.50 mole) portion of the sample was heated under agitation to 60–65° C. and held at that temperature while 51.8 g. of 36.2% aqueous hydrogen peroxide (0.55 mole was added thereto over a period of about 0.5 hr., following which the mixture was agitated at 75° C. was 6.25 hr. A total of 244.5 g. of dilution water was added portionwise as required during the course of the reaction to keep the mixture fluid enough for effective agitation. After standing overnight at room temperature, the reacted mixture was analyzed and found to contain 27.5% amine oxide and 3.3% amine. The amine oxide content corresponded to a conversion of 88.8%, based upon the amine used.

*Example 2*

The procedure of Example 1 was repeated employing materials from the same sources and in the same amounts, except (a) an amount of diethylenetriaminepentaacetic acid (DTPA) equal to 1% of the weight of the amine was mixed with the amine before the latter was used, and (b) the total reaction time at 60 to 75° C. was 5 hr. Analyses of the final reacted mixture showed that it contained 30.6% amine oxide and 0.34% amine. The conversion of amine to amine oxide was 98.8%.

*Example 3*

The procedure of Example 1 was repeated employing materials from the same sources and in the same amounts, except that (a) an amount of DTPA equal to 0.01% of the weight of the amine was mixed with the amine before the latter was used, and (b) the total reaction time at 60 to 75° C. was 4.5 hr. Analyses of the final reacted mixture showed that it contained 30.5% amine oxide and 0.57% amine. The conversion of amine to amine oxide was 98.0%.

*Example 4*

The procedure of Example 1 was repeated employing materials from the same sources and in the same amounts except that (a) an amount of sodium gluconate equal to 1% of the weight of the amine was mixed with the amine before the latter was used, and (b) the total reaction time at 60 to 75° C. was 6.5 hr. Analyses of the final reacted mixture showed that it contained 28.9% amine oxide and 2.6% amine. The conversion of amine to amine oxide was 91.4%.

*Example 5*

The procedure of Example 1 was repeated employing materials from the same sources and in the same amounts except that (a) an amount of the disodium salt of ethylenediaminetetraacetic acid ($Na_2EDTA$) equal to 1% of the weight of the amine was mixed with the amine before the latter was used and (b) the total reaction time at 60 to 75° C. was 5.25 hr. Analyses of the final reacted mixture showed that it contained 30.7% amine oxide and 0.9% amine. The conversion of amine to amine oxide was 97.0%.

*Example 6*

The procedure of Example 1 was repeated employing materials from the same sources and in the same amounts except that (a) an amount of "Karasist" 543 equal to 1% of the weight of the amine was mixed with the amine before the latter was used and (b) the total reaction time at 60 to 75° C. was 5 hr. "Karasist" 543 is a chelating agent and recommended for use under alkaline oxidizing conditions. Analyses of the final reaction mixture showed that it contained 30.2% amine oxide and 0.8% amine. The conversion of amine to amine oxide was 97.2%.

*Example 7*

A sample of a commercial (undistilled) DDA having a neutralization equivalent of 224.6 and obtained from a different source from that used in Example 1, was employed in the absence of any chelating agent and following the general procedure described in Example 1. There were used 112.3 g. (0.50 mole) of the amine and 50.1 g. of 36.2% aqueous hydrogen peroxide (0.53 mole). The amount of water used to dilute the reaction mixture during the course of the reaction was 235.2 g. and the total reaction time at 60 to 75° C. was 7 hr. Analyses of the final reaction mixture showed that it contained 28.3% amine oxide and 2.1% amine. The conversion of amine to amine oxide was 92.5%.

*Example 8*

The procedure of Example 7 was repeated employing materials from the same sources and in the same quantities except that an amount of DTPA equal to 0.01% of the weight amine was mixed with the amine before the latter was used. Analyses of the final reacted mixture showed that it contained 29.9% amine oxide and 0.12% amine. The conversion of amine to amine oxide was 99.6%.

*Example 9*

The procedure of Example 7 was repeated employing materials from the same sources and in the same amounts except that (a) the amine was mixed before use with 0.01% of its weight of DTPA, (b) 51.8 g. of 36.2% aqueous hydrogen peroxide (0.55 mole) and 244.5 g. of dilution water were used, and (c) the reaction time at 60 to 75° C. was 6 hr. Analyses of the final reacted mixture showed that it contained 29.8% amine oxide, and 0.26% amine. The conversion of amine to amine oxide was 99.1%.

The substitution of commercial (undistilled) dimethyl coconut amine for the DDA in the procedures of Examples 8 and 9 gives results similar to those reported in those examples. Dimethyl coconut amine is a mixture of dimethyl alkyl amines whose "alkyl" portion is derived from coconut alcohol or fatty acid and has approximately the following chain length composition: $C_8$, 8%; $C_{10}$, 9%; $C_{12}$, 47%; $C_{14}$, 18%; $C_{16}$, 8%; and $C_{18}$, 10%.

The results of Examples 1 and 7 show that when commercial grade amine is employed in its usual unpurified, undistilled and untreated form, the conversion of the amine to amine oxide will range from about 87 to 93% and the product solution will contain a substantial amount of unconverted amine. A comparison of the results of these examples with those for Examples 2, 3, 8 and 9 shows that by simply premixing the amine with from 0.01 to 1% of DTPA and then carrying out the reaction under essentially the same conditions, the conversion of amine to amine oxide can be increased to at least 98% and the unconverted amine content can be reduced to around 0.6% or less. The increased conversions are obviously important for economic reasons. The decrease in the content of unreacted amine is also important since the presence of a significant amount of unreacted amine reduces substantially the effectiveness of the amine oxide product as a detergent. It is, therefore, highly desirable that the unreacted amine content be kept as low as possible without having to resort to costly purification treatments designed to remove unreacted amine.

A comparison of the results of Examples 2, 3, 8 and 9 in which DTPA was used with those of Examples 4, 5 and 6 in which other commercial chelating agents were used shows that DTPA gives roughly about a 2% higher conversion than do the better of the other chelating agents and results in products containing about half as much unreacted amine.

The method of the invention as illustrated by Examples 2, 3, 8 and 9 is applicable, with generally similar results, to the preparation of amine oxides from all of the tertiary aliphatic amines of the general formula set forth above, or mixtures of such amines. Specific examples of such amines which can be reacted in accordance with the invention are dimethyldecylamine, dimethyldodecylamine, diethyldodecylamine, dimethyltridecylamine, dimethyltetradecylamine, dimethylhexadecylamine, dimethyloctadecylamine and dimethyl coconut amine. The use of dimethyldodecylamine or dimethyl coconut amine is generally preferred because of their availability and the excellent detergent properties of their oxides.

I claim:

1. In a method for reacting aqueous hydrogen peroxide and a tertiary aliphatic amine of the formula

wherein each of $R^1$ and $R^2$ is from the group consisting of methyl and ethyl radicals and $R^3$ is an alkyl radical having from 10 to 20 carbon atoms, to produce an aqueous amine oxide product solution, said reaction being effected employing at least a stoichiometric amount of said aqueous hydrogen peroxide but not more than about a 10% excess thereof, the improvement comprising employing as the amine reactant an amine of said formula which contains heavy metal impurities and, prior to its use in the reaction, mixing therewith from 0.005 to 3%, based upon the weight of said amine, of a chelating agent of the group consisting of diethylenetriaminepentaacetic acid and its ammonium and alkali metal salts.

2. In a method for reacting aqueous hydrogen peroxide and a tertiary aliphatic amine of the formula

wherein each of $R^1$ and $R^2$ is from the group consisting of methyl and ethyl radicals and $R^3$ is an alkyl radical having from 10 to 20 carbon atoms, to produce directly an aqueous amine oxide produce solution of relatively high amine oxide content and low unreacted amine content, said method comprising agitating a body of said amine at a temperature in the range from 40 to 80° C. while gradually adding thereto at least a stoichiometric amount but not more than about a 10% excess of aqueous hydrogen peroxide containing at least 20% $H_2O_2$ by weight, agitating and maintaining the resulting mixture at a temperature within said range while completing the reaction and, during the course of the reaction diluting the reaction mixture with added water as required to permit effective agitation of the reaction mixture, the improvement comprising employing as the amine reactant an amine of said formula which contains heavy metal impurities and, prior to its use, mixing therewith from 0.005 to 3%, based upon the weight of said amine, of a chelating agent from the group consisting of diethylenetriaminepentaacetic acid and its ammonium and alkali metal salts.

3. The method of claim 2 wherein the amine reacted is dimethyldodecylamine.

4. The method of claim 2 wherein the amine reacted is dimethyl coconut amine.

5. The method of claim 2 wherein the amine is mixed with 0.01 to 1.5% of said chelating agent.

6. The method of claim 2 wherein the chelating agent is diethylenetriaminepentaacetic acid.

References Cited by the Examiner

UNITED STATES PATENTS 3,047,579   7/1962   Witman _____ 260—583 XR

OTHER REFERENCES

Chaberek et al.: "Organic Sequestering Agents," J. Wiley & Sons, Inc., New York (1959), p. 315.

CHARLES B. PARKER, *Primary Examiner.*

ANTON H. SUTTO, RICHARD L. RAYMOND, *Assistant Examiners.*